(12) United States Patent
Yamazaki

(10) Patent No.: US 11,584,016 B2
(45) Date of Patent: Feb. 21, 2023

(54) ROBOT CONTROLLER AND SYSTEM

(71) Applicant: Fanuc Corporation, Yamanashi (JP)

(72) Inventor: Tatsuhiro Yamazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 715 days.

(21) Appl. No.: 16/372,922

(22) Filed: Apr. 2, 2019

(65) Prior Publication Data

US 2019/0321984 A1 Oct. 24, 2019

(30) Foreign Application Priority Data

Apr. 24, 2018 (JP) .............................. JP2018-083184
Jan. 25, 2019 (JP) .............................. JP2019-011349

(51) Int. Cl.
*B25J 9/16* (2006.01)
*B25J 15/10* (2006.01)

(52) U.S. Cl.
CPC ............ *B25J 9/1697* (2013.01); *B25J 9/163* (2013.01); *B25J 15/10* (2013.01)

(58) Field of Classification Search
CPC . B25J 9/1697; B25J 9/163; B25J 15/10; B25J 9/0093; B25J 9/1612; B25J 15/0023; B25J 15/12; B25J 13/00; B25J 11/0045; B25J 13/082; B25J 9/1633; G05B 2219/40053; G05B 2219/39476
See application file for complete search history.

(56) References Cited

U.S. PATENT DOCUMENTS

| | | | |
|---|---|---|---|
| 9,873,199 B2 | 1/2018 | Wellman et al. | |
| 9,914,213 B2 | 3/2018 | Vijayanarasimhan et al. | |
| 10,981,272 B1* | 4/2021 | Nagarajan | .............. B25J 9/1669 |
| 2011/0166696 A1 | 7/2011 | Nignon | |
| 2012/0175904 A1* | 7/2012 | Murakami | ............... B25J 15/08 |
| | | | 294/213 |
| 2015/0224649 A1 | 8/2015 | Watanabe | |

(Continued)

FOREIGN PATENT DOCUMENTS

| | | |
|---|---|---|
| EP | 3284563 A2 | 2/2018 |
| EP | 3636392 A1 | 4/2020 |

(Continued)

OTHER PUBLICATIONS

Ishikawa, Kaoru; Notice of Reasons for Refusal; Japanese Patent Application No. 2019-011349; dated Sep. 15, 2020; 3 pages.

(Continued)

*Primary Examiner* — Nicholas Kiswanto
*Assistant Examiner* — Danielle Marie Jackson
(74) *Attorney, Agent, or Firm* — Shackelford, Bowen, McKinley & Norton, LLP

(57) ABSTRACT

A robot controller is a controller which controls, via a hand control device, a robot hand that grips an article with two or more gripping portions. The robot controller includes, a size information acquisition unit which acquires size information about the article based on an image obtained by a visual sensor for detecting the article, and a gripping adjustment unit which changes, in response to the size information, a (Continued)

gripping distance, which is the space between the gripping portions, in a gripping state or a gripping force of the gripping portions in the gripping state.

10 Claims, 11 Drawing Sheets

(56) References Cited

U.S. PATENT DOCUMENTS

| | | |
|---|---|---|
| 2015/0273688 A1 | 10/2015 | Harada et al. |
| 2016/0167227 A1 | 6/2016 | Wellman et al. |
| 2016/0167228 A1 | 6/2016 | Wellman et al. |
| 2016/0221188 A1* | 8/2016 | Nagai ................ B25J 9/1612 |
| 2016/0361821 A1 | 12/2016 | Lessing et al. |
| 2017/0021499 A1 | 1/2017 | Wellman et al. |
| 2017/0028561 A1 | 2/2017 | Yamada et al. |
| 2017/0057092 A1* | 3/2017 | Ito .................... B25J 9/1679 |
| 2017/0106532 A1 | 4/2017 | Wellman et al. |
| 2017/0252922 A1 | 9/2017 | Levine et al. |
| 2017/0252924 A1 | 9/2017 | Vijayanarasimhan et al. |
| 2017/0282363 A1* | 10/2017 | Yamada .............. B25J 15/0071 |
| 2017/0369244 A1* | 12/2017 | Battles ................ B65G 1/137 |
| 2018/0036774 A1 | 2/2018 | Lukka et al. |
| 2018/0050451 A1 | 2/2018 | Takanishi et al. |
| 2018/0141211 A1 | 5/2018 | Wellman et al. |
| 2018/0147723 A1 | 5/2018 | Vijayanarasimhan et al. |
| 2018/0297199 A1 | 10/2018 | Kobayashi et al. |
| 2019/0184554 A1* | 6/2019 | Yamazaki ............ B25J 9/1697 |
| 2019/0283245 A1 | 9/2019 | Levine et al. |
| 2020/0215686 A1 | 7/2020 | Vijayanarasimhan et al. |
| 2021/0110504 A1 | 4/2021 | Lukka et al. |

FOREIGN PATENT DOCUMENTS

| | | |
|---|---|---|
| EP | 3742347 A1 | 11/2020 |
| JP | S60-123285 A | 7/1985 |
| JP | S61-122509 A | 6/1986 |
| JP | 2007-245326 A | 9/2007 |
| JP | 2008-049459 A | 3/2008 |
| JP | 2015-150636 A | 8/2015 |
| JP | 2015-182184 A | 10/2015 |
| JP | 2017-136677 A | 8/2017 |
| JP | 2018-027581 A | 2/2018 |
| JP | 2018-039059 A | 3/2018 |
| JP | 2018-176356 A | 11/2018 |
| WO | WO-2016100235 A1 | 6/2016 |
| WO | WO-2016201418 A1 | 12/2016 |
| WO | WO-2017151206 A1 | 9/2017 |
| WO | WO-2017151926 A1 | 9/2017 |
| WO | WO-2018024944 A1 | 2/2018 |

OTHER PUBLICATIONS

Industrial Property Cooperation Center; Search Report by Registered Search Organization; Japanese Patent Application No. 2019-011349; dated Sep. 4, 2020; 10 pages.

Liebschner, Office Action, German Patent Application No. 10 2019 109 880.7, German Patent Office, dated Apr. 27, 2022.

* cited by examiner

FIG. 7

| AREA VALUE (cm²) | AIR PRESSURE |
|---|---|
| 25~27 | LEVEL 5 |
| 27~29 | LEVEL 4 |
| 29~31 | LEVEL 3 |
| 31~33 | LEVEL 2 |
| 33~35 | LEVEL 1 |

| AREA VALUE (cm²) | AIR PRESSURE |
|---|---|
| 24~26 | LEVEL 5 |
| 26~28 | LEVEL 4 |
| 28~30 | LEVEL 3 |
| 30~32 | LEVEL 2 |
| 32~34 | LEVEL 1 |

| AREA VALUE (cm²) | AIR PRESSURE |
|---|---|
| 28~29 | LEVEL 5 |
| 29~30 | LEVEL 4 |
| 30~31 | LEVEL 3 |
| 31~32 | LEVEL 2 |
| 32~33 | LEVEL 1 |

~23g

US 11,584,016 B2

ROBOT CONTROLLER AND SYSTEM

CROSS-REFERENCE TO RELATED APPLICATIONS

This application is based on and claims priority to Japanese Patent Application No. 2018-083184 filed on Apr. 24, 2018 and Japanese Patent Application No. 2019-011349 filed on Jan. 25, 2019, the entire contents of which are incorporated herein by reference.

TECHNICAL FIELD

The present invention relates to a robot controller and a system.

BACKGROUND ART

Robots have been known that pick articles having a metallic luster, such as bolts, using robot hands provided on the distal ends of the robots (for example, see PTL 1). As such, robot hands have conventionally been used for the task of picking articles that are not easily deformed, thereby increasing work efficiency.

CITATION LIST

Patent Literature

{PTL 1}
Japanese Unexamined Patent Application, Publication No. 2015-182184

SUMMARY OF INVENTION

A first aspect of this disclosure is a robot controller that controls a robot hand which grips an article with a plurality of gripping portions. The robot controller includes: a size information acquisition unit which acquires size information about the article based on an image obtained by a visual sensor for detecting the article; and a gripping adjustment unit which changes, in response to the size information, a gripping distance that is a space between the gripping portions in a gripping state, or a gripping force of the gripping portions in the gripping state.

A second aspect of this disclosure is a robot controller that controls a robot hand gripping an article with a plurality of gripping portions. The robot controller includes: a size information acquisition unit which acquires size information about the article; a gripping adjustment unit which changes, in response to the size information, a gripping distance that is a space between the gripping portions in a gripping state, or a gripping force of the gripping portions in the gripping state; and a learning unit that performs learning for improving the gripping state based on the size information and information about the gripping state in which the robot hand grips the article.

A third aspect of this disclosure is a management system including: a robot controller that controls a robot hand for gripping an article; and a host computer system capable of communicating with the robot controller. The robot controller includes: a learning unit that performs, based on size information about the article and information about a gripping state in which the robot hand grips the article, learning for improving the gripping state; and an output unit that outputs a result of the learning to the host computer system.

The host computer system accumulates the result of the learning received from the robot controller.

BRIEF DESCRIPTION OF DRAWINGS

FIG. 7 illustrates an exemplary table stored in a storage unit of the robot controller in the embodiment.
FIG. 8 illustrates an exemplary table stored in the storage unit of the robot controller in the embodiment.
FIG. 9 illustrates an exemplary table stored in the storage unit of the robot controller in the embodiment.

DESCRIPTION OF EMBODIMENTS

A robot controller 20 and a robot system according to an embodiment will be described below with reference to the drawings.

Figure 1:
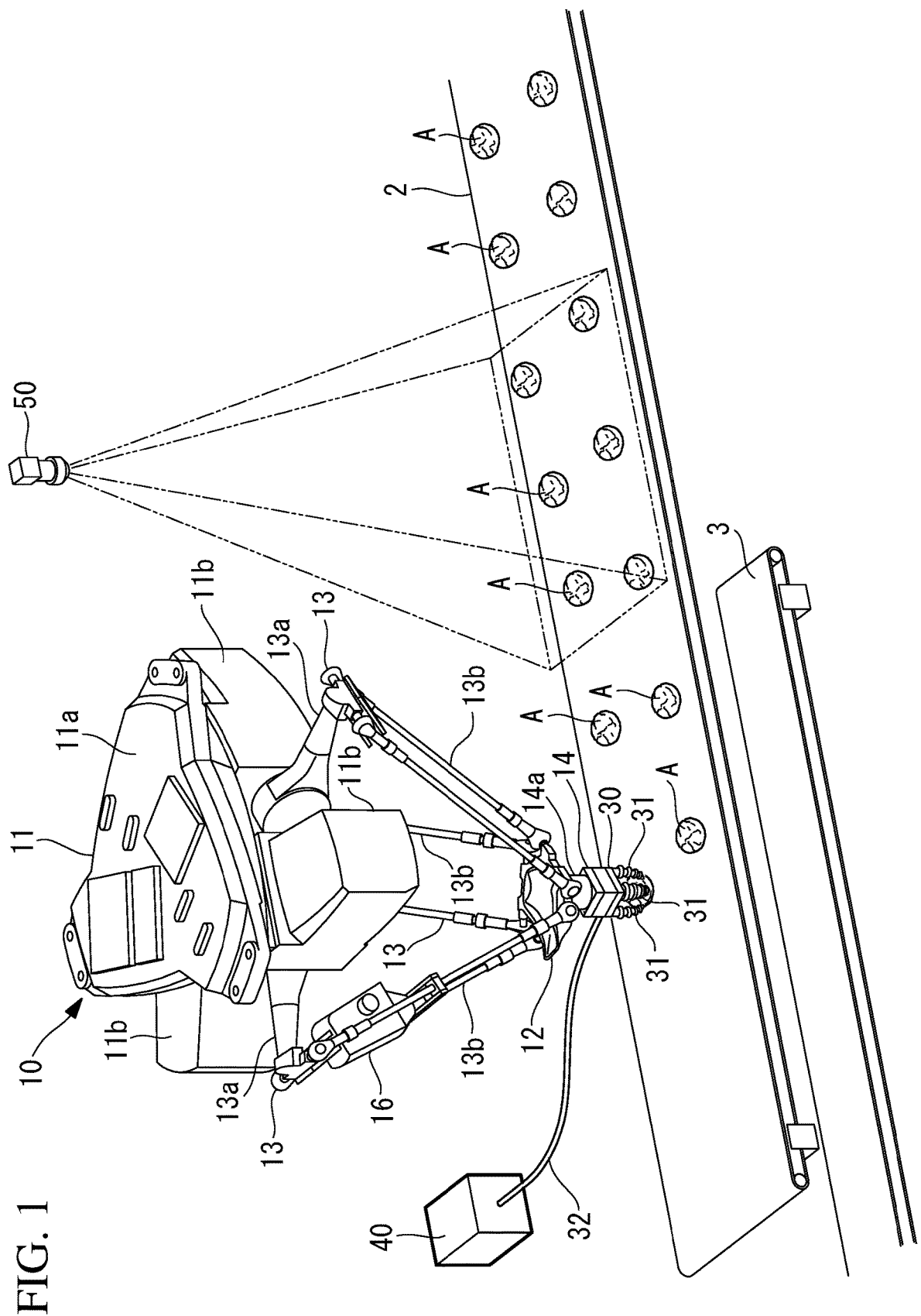
FIG. 1 is a general configuration diagram of a robot system in an embodiment.

In the robot system in this embodiment, as shown in FIG. 1, articles A conveyed by a conveyer device 2 such as a conveyer are picked out of the conveyer device 2 by a robot hand 30 attached to a robot 10. In this embodiment, the articles A are soft objects that may vary in shape, such as cream puffs, bread, or cakes.

In this embodiment, the robot 10 is a parallel link robot and includes a main body 11, a movable plate 12 disposed below the main body 11, three link units 13 that link the main body 11 and the movable plate 12, and a wrist unit 14 mounted on the movable plate 12. The robot 10 may also be a vertical articulated robot or a horizontal articulated robot (SCARA robot).

As shown in FIG. 1, the main body 11 includes a base member 11a extending approximately horizontally and three driving units 11b fixed on the lower surface of the base member 11a. Each driving unit 11b houses a servo motor 15 (FIG. 4) having a reducer, and one end of a driving link 13a of each link unit 13 is fixed to an output shaft of the corresponding driving unit 11b. One of the link units 13 has a servo motor 16 (FIGS. 1 and 4) attached thereto, which rotates a wrist flange 14a of the wrist unit 14 about a vertical axis.

As shown in FIG. 1, each link unit 13 includes the driving link 13a and a driven link 13b, and the other end of the driving link 13a is coupled to one end of the driven link 13b. This other end of the driving link 13a and the one end of the driven link 13b are coupled by a spherical bearing. The other end of each driven link 13b is coupled to the movable plate 12 by a spherical bearing.

The base member 11a of the main body 11 is supported by a frame (not shown) for example, so that the robot 10 is disposed above the conveyer device 2.

The robot hand 30 is supported by the wrist flange 14a. Thus, the robot hand 30 rotates about the aforementioned vertical axis together with the wrist flange 14a. The wrist unit 14 may be part of the robot hand 30.

Figure 2:
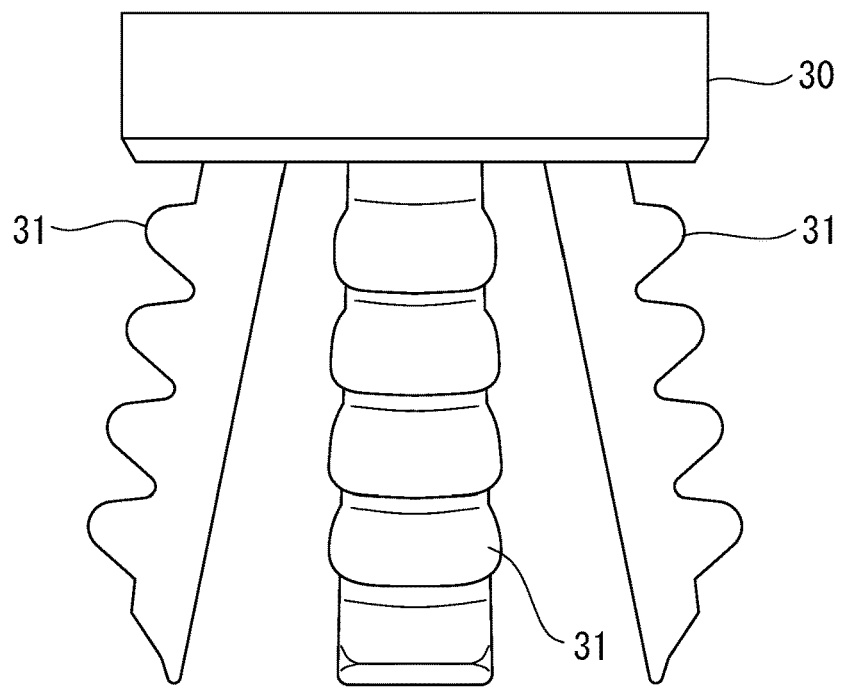
FIG. 2 is a front view of a robot hand used in the robot system in the embodiment.
Figure 3:
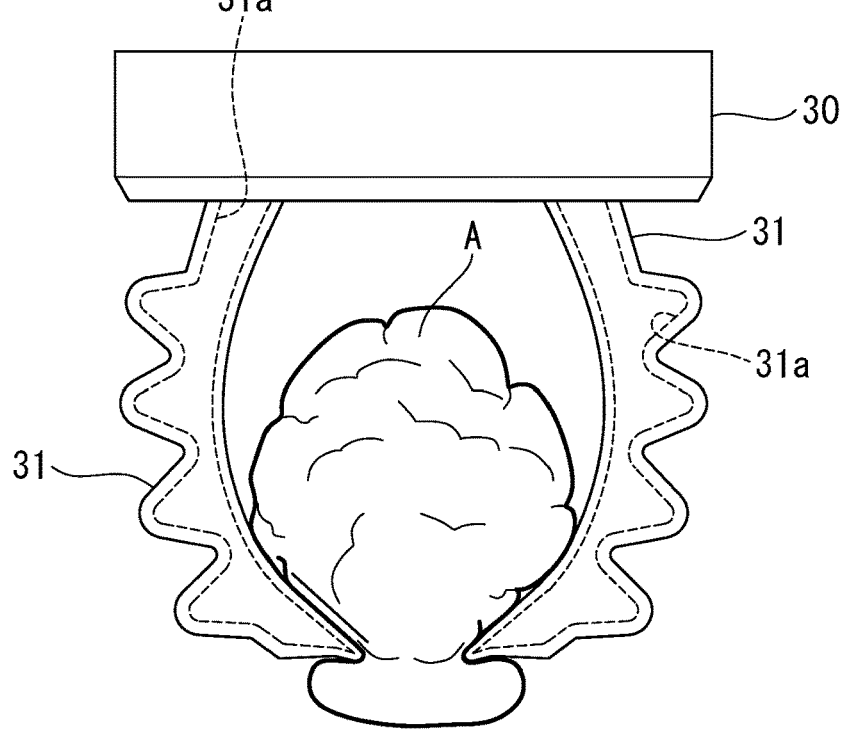
FIG. 3 is a diagram for describing operation of the robot hand in the embodiment.

As shown in FIGS. 1, 2, and etc., the robot hand 30 has multiple gripping portions 31, each formed of a material having rubber-like elasticity. As the material having rubber-like elasticity, rubber or silicone may be used. In this embodiment, each gripping portion 31 is a robot finger having an internal space 31a, and the gripping portion 31 is bent according to the pressure of air supplied to the internal space 31a (FIG. 3). Examples available as the robot hand 30 are M4FC and M5FC manufactured by Soft Robotics, Inc.

As shown in FIG. 1, the gripping portions 31 of the robot hand 30 are connected via an air supply tube 32 to a hand control device 40, which is connected to an air supply source (not shown). The hand control device 40 has a pressure adjustment valve, with which the pressure of the air supplied to the gripping portions 31 of the robot hand 30 is adjusted in multiple levels. In this embodiment, the hand control device 40 can adjust the pressure of the air supplied to the gripping portions 31 in five levels from level 1 to level 5, as an example. The number of levels of the air pressure is not limited to five.

When the hand control device 40 supplies air to the gripping portions 31, the distal ends of the gripping portions 31 come close to each other as shown in FIG. 3 to bring the gripping portions 31 into the gripping state for gripping the article A. When the hand control device 40 reduces the air pressure in the internal spaces 31a of the gripping portions 31 to atmospheric pressure or negative pressure, the gripping portions 31 are brought into the non-gripping state for releasing the article A. In FIG. 3, when air pressure higher than an appropriate pressure is applied to the gripping portions 31, which leads to undesirable deformation of the article A.

With an air pressure of level 5 supplied from the hand control device 40 to the gripping portions 31, the distal ends of the gripping portions 31 come closer to each other and the gripping portions 31 grip the article A with a greater gripping force than with an air pressure of level 1. Air pressures of levels 2 to 4 vary the distance between the distal ends of the gripping portions 31 stepwise between levels 1 to 5. That is, the air pressures of levels 1 to 5 change the gripping distance, which is the space between the distal ends of the gripping portions 31, in multiple levels and also changes the gripping force of the gripping portions 31 in multiple levels.

A visual sensor 50 is provided above the conveyer device 2. The visual sensor 50 may be any sensor capable of obtaining images of the articles A on the conveyer device 2. A 2D camera, a 3D camera, or a 3D sensor may be used as the visual sensor 50. Images taken by the visual sensor 50 are sequentially transmitted to the robot controller 20.

Figure 4:
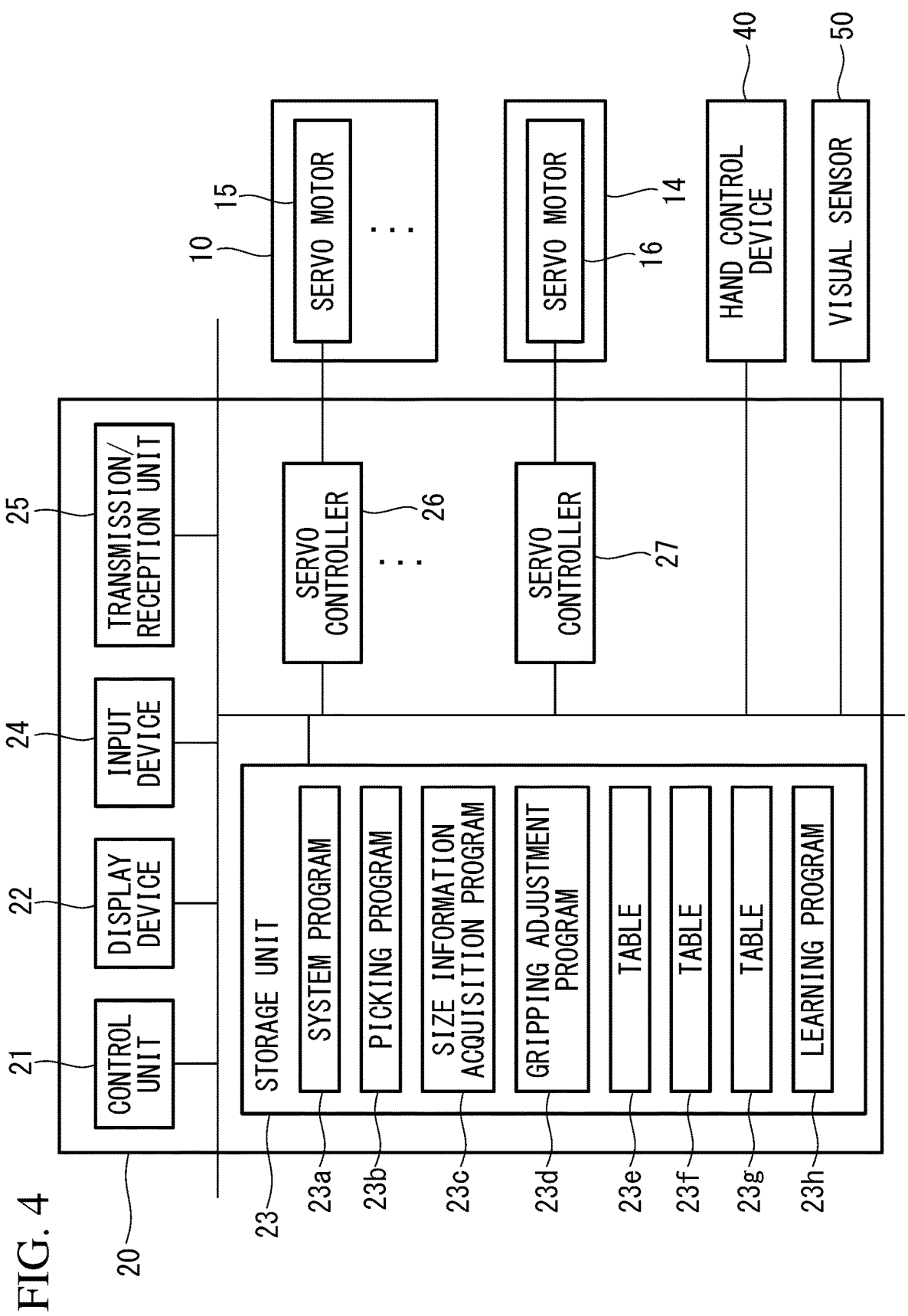
FIG. 4 is a block diagram of a robot controller in the embodiment.

As shown in FIG. 4, the robot controller 20 includes: a control unit 21 including a processor; a display device 22; a storage unit 23 including nonvolatile storage, ROM, and RAM; an input device 24 that may be a keyboard, a touch panel, or an operation panel; a transmission/reception unit 25 for transmitting and receiving signals; servo controllers 26 connected to the respective servo motors 15; and a servo controller 27 connected to the servo motor 16. The input device 24 and the transmission/reception unit 25 function as input units.

The storage unit 23 stores a system program 23a responsible for basic functions of the robot controller 20. The storage unit 23 also stores a picking program 23b, a size information acquisition program (a size information acquisition means) 23c, and a gripping adjustment program (a gripping adjustment means) 23d. Based on the picking program 23b, the size information acquisition program 23c, and the gripping adjustment program 23d, the control unit 21 controls each of the servo motors 15 and 16 and transmits, to the hand control device 40, control signals for adjusting the gripping by the robot hand 30.

Figure 5:
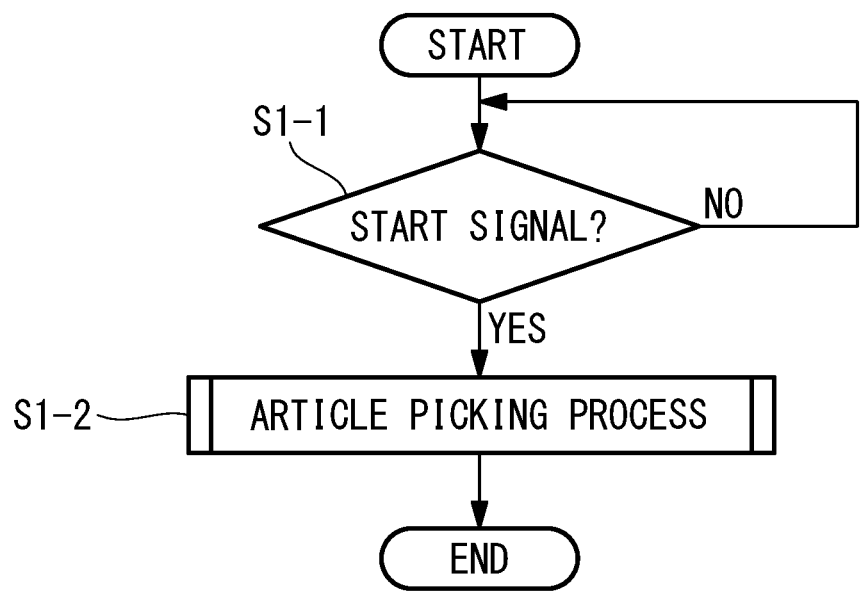
FIG. 5 a flowchart illustrating operation of a control unit of the robot controller in the embodiment.

Processing in the control unit 21 when the robot 10 performs the task of picking the articles A on the conveyer device 2 with the robot hand 30 will be described below with reference to the flowcharts in FIGS. 5 and 6. Controls described below are performed while the articles A are being conveyed by the conveyer device 2.

Upon receiving a start signal from the input device 24 or the transmission/reception unit 25 (step S1-1), the control unit 21 performs a picking process for picking an article A captured in an image transmitted from the visual sensor 50, conducting known image processing to the image (step S1-2).

Figure 6:
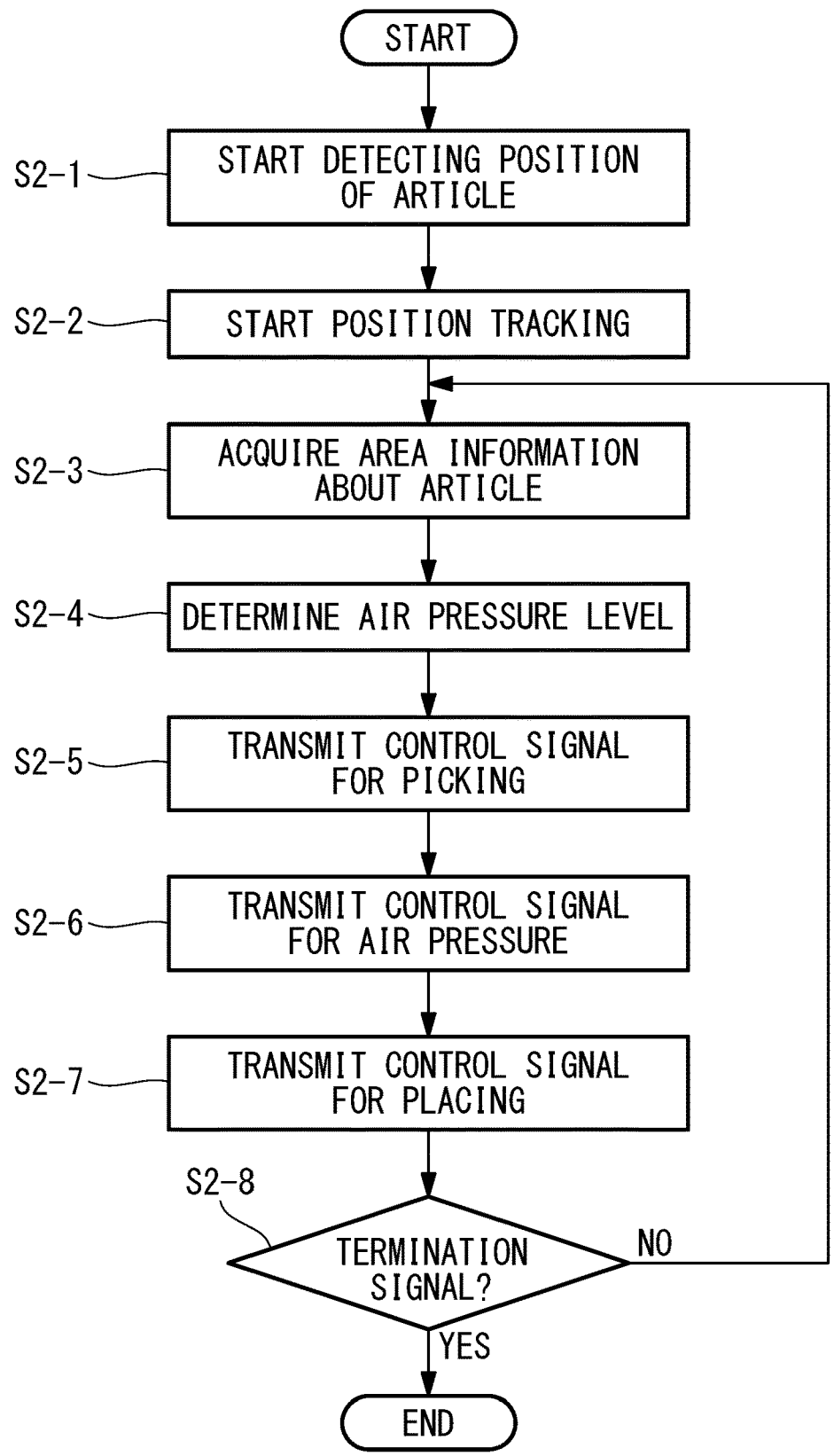
FIG. 6 is a flowchart illustrating a process in the control unit of the robot controller in the embodiment.

An example of the picking process in step S1-2 is described in FIG. 6. In the example of FIG. 6, based on the picking program 23b, the control unit 21 first starts detecting the position of the article A in the image processed by the known image processing (step S2-1). Also, based on the picking program 23b, the control unit 21 calculates the moving speed of the conveyer device 2 using the positions of the same article A in multiple images and starts tracking the position of the article A using the calculated moving speed (step S2-2).

Then, based on the size information acquisition program 23c, the control unit 21 acquires area information (size information) about the position-tracked article A using the image processed by the image processing (step S2-3). If multiple articles A are being tracked, the control unit 21 acquires area information about each of the articles A. In an example, the image processing is binarization processing, and the area information about the article A is the area value (size information) of a region extracted by the binarization processing.

Then, based on the gripping adjustment program 23d, the control unit 21 determines at which of levels 1 to 5 the air pressure should be supplied to the gripping portions 31 (step S2-4).

At step S2-4, the control unit 21 uses, for example, a table 23e as illustrated in FIG. 7 stored in the storage unit 23 to determine the air pressure level corresponding to the area value of the article A. The table 23e defines multiple area ranges, to which the respective air pressures of levels 1 to 5 correspond. The control unit 21 uses the table 23e stored in the storage unit 23 to determine the air pressure level corresponding to the area value of each article A being tracked. It is to be noted that 25-27 in the table 23e means 25 or above and below 27.

Here, the articles A such as cream puffs are softer than the gripping portions 31 of the robot hand 30. The gripping portions 31 are made of a flexible material but are much harder than the articles A. Therefore, the air pressure determined at step S2-4 is desirably such an air pressure that prevents the gripping portions 31 from breaking, deforming, or leaving contact marks on the articles A. That is, air pressures that significantly deform the articles A as in FIG. 3 are inappropriate. At the same time, the articles A such as cream puffs are heavy compared with their softness. Therefore, for lifting the articles A with the gripping portions 31 without crushing the articles A, each area range in the table 23e is preferably narrow.

Then, based on the picking program 23b, the control unit 21 transmits, to each of the servo controllers 26 and 27, control signals for picking the article A being tracked (step S2-5). Also, based on the gripping adjustment program 23d, the control unit 21 transmits, to the hand control device 40, a control signal for supplying air pressure of the level determined for the article A to the gripping portions 31 (step S2-6). Thus, the article A is picked out of the conveyer device 2.

Based on the picking program 23b, the control unit 21 transmits, to each of the servo controllers 26 and 27, control signals for placing the gripped article A on a conveyor 3 where the article A is to be transferred (step S2-7). The control unit 21 repeats steps S2-3 to S2-7 until a termination signal is received from the input device 24 or the transmission/reception unit 25 (step S2-8).

Instead of the table 23e, the storage unit 23 may store a formula for determining the air pressure level from the area value of the article A. In this case, at step S2-4, the control unit 21 uses the formula stored in the storage unit 23 to determine the air pressure level, among levels 1 to 5, corresponding to the area value of each article A being tracked.

Other known means or methods may also be used to determine the air pressure level, among levels 1 to 5, corresponding to the area value of each article A being tracked.

Thus, in this embodiment, as the size information about the article A, the area value of the article A is acquired based on the image obtained by the visual sensor 50 for detecting the article A. According to the area value, the control unit 21 changes the gripping distance, which is the space between the gripping portions 31, in the gripping state, or the gripping force of the gripping portions 31 in the gripping state.

Since the control unit 21 changes the gripping distance or the gripping force in response to the size information in this manner, the soft articles A that may vary in shape are appropriately gripped by the gripping portions 31.

Here, the articles A, which are food such as cream puffs, bread, or cakes, may vary in shape or hardness. Also, especially if the articles A are filled with a highly viscous liquid such as cream, pressing a portion of the periphery of an article A often tends to cause other portions of the periphery to expand. In this case, even with a portion of the periphery pressed, it can also be said that the change in the area of the article A in a planar view is relatively little.

In this embodiment, the control unit 21 changes the gripping distance or the gripping force according to the area value of the region detected as the article A in the image. This is advantageous for appropriately gripping the articles A that may vary in shape.

Alternatively, the control unit 21 may change the gripping distance or the gripping force according to dimension data about the region detected as the article A in the image. The dimension data may be the maximum or average diameter of the article A in the images. Still in this case, the articles A that may vary in shape can be appropriately gripped. However, the dimension may vary with the direction in which the diameter is measured. In contrast, using the area value can reduce the likelihood of occurrence of such variations. Using perimeter data as the dimension data can also reduce the likelihood of occurrence of such variations.

In this embodiment, the robot hand 30 has the hand control device 40 that changes the gripping distance or the gripping force in levels 1 to 5. The apparatus includes the storage unit 23 that stores the table 23e or formula correlating area values (the size information) with levels 1 to 5. The control unit 21 uses the table 23e or the formula to transmit, to the hand control device 40, a control signal for setting the gripping distance or the gripping force to a level, among levels 1 to 5, according to the area value of the article A being tracked.

The robot hand 30 that changes the gripping distance or gripping force of the gripping portions 31 in the multiple levels is easy to control, as well as easy to simplify in structure. Therefore, robot hands like the robot hand 30 are often used in manufacturers of the articles A to be picked.

In this embodiment, the table 23e or formula that correlates the gripping distance or the gripping force with area values is used to transmit, to the hand control device 40, a control signal for setting the gripping distance or the gripping force to a level according to the area value. This can simplify control in the robot controller 20 and also reduce efforts required for adjusting the gripping distance or the gripping force.

As described above, the articles A, for example cream puffs, bread, or cakes, have inconstant shapes or hardness that may vary day by day. Therefore, the gripping distance or the gripping force is preferably adjusted every day.

For this purpose, multiple tables may be saved in the storage unit 23. For example, as shown in FIG. 8, a table 23f may further be saved, in which the range of area values corresponding to each of levels 1 to 5 differs from that of the table 23e in FIG. 7. The table 23f in FIG. 8 is used for the articles A that are harder than usual, for example.

On a day when the articles A have a narrow variation in their shape, a table 23g in FIG. 9 saved in the storage unit 23 may be used, where the holding pressures of the multiple levels by the pressure adjustment valve of the hand control device 40 are made closer to each other. This adjustment is performed when the articles A have a narrow variation.

Instead of the multiple tables 23e, 23f, and 23g, the storage unit 23 may store multiple formulas, each having a different range of area values corresponding to each of levels 1 to 5.

Further, the control unit 21 may select and use one of the tables 23e and 23f based on the distribution of the area values of multiple articles A, determined from one or more images. Similarly, the control unit 21 may select and use one of the multiple formulas stored in the storage unit 23.

Thus, the control unit 21 changes the area values corresponding to levels 1 to 5 based on the distribution of the area values of the articles A in the image(s). This is advantageous for reducing failures to pick the articles A or reducing breakage of, deformation of, and contact marks on the articles A.

An imaging device for observation may further be provided for imaging the work area of the robot 10 on the conveyer device 2, or for imaging an area downstream from the work area. In this case, the imaging device detects articles A that the robot 10 fails to pick. If the number of unpicked articles A is above a threshold, the control unit 21 changes the ranges of area values corresponding to the respective levels 1 to 5 of the gripping distance or the gripping force. For example, the control unit 21 changes the reference used at step S2-4 from the table 23f to the table 23e. With this configuration, the work load required for the adjustment are reduced, resulting in increased production efficiency for the articles A.

Even if the articles A are objects having a longitudinal axis, such as éclairs, the gripping distance or the gripping force can be adjusted according to the area value as described above, and the same effects as described above can be achieved. For the articles A having a longitudinal axis, the control unit 21 detects the position and the orientation (the direction of the longitudinal axis) of each article A at step S2-1. The control unit 21 may further detect the center of gravity of the article A at step S2-1.

The gripping portions 31 of the robot hand 30 may be known metallic or hard-plastic robot fingers. In this case, the control unit 21 changes the gripping distance, which is the space between the distal ends of the robot fingers, or the gripping force of the robot fingers according to the area value of the article A, which is the size information about the article A. The same operational effects as described above can be achieved in this case as well.

The robot hand 30 may have a spherical shape. In this case, the robot hand 30 grips the article A with multiple portions of the sphere, which are made closer to each other according to the pressure of air supplied into the robot hand 30. Each of the portions of the sphere functions as a gripping portion.

In the above embodiment, the robot controller 20 may have a learning function. For example, the storage unit 23 may store a learning program (a learning unit) 23h, based on which the control unit 21 may perform learning.

For example, learning is performed during the process of picking the article A as described in the steps S2-1 to S2-7. The control unit 21 uses information for learning to create a table or formula that correlates area values with the air pressure levels, and stores the created table or formula in the storage unit 23. Such a table or formula is created as a result of learning for improving the gripping state.

An example of the information for learning is the table or formula that correlates the size information with the air pressure levels, used for the picking process. Another example of the information for learning is size information and air pressure information. As described above, the size information includes information such as the area value, dimension data, perimeter data, and center of gravity detected for each article A. The size information also includes information such as the area, dimensions, and weight of each article A obtained in some other step, for example by an inspection device in an inspection step. The size information also includes information input by an operator through the input device 24 based on the area, dimensions, or weight of each article A obtained by measurement. Another example of the information for learning is specifications of the robot hand 30 and the gripping portions 31 used for the picking process. Another example of the information for learning is specifications of the robot 10 and the conveyer device 2 used for the picking process. Another example of the information for learning is the conveying speed of the conveyer device 2 in the picking process. Another example of the information for learning is information about the quality of each article, such as the hardness or average weight of the articles A. Another example of the information for learning is information about the gripping state obtained based on the aforementioned imaging device for observation. The information about the gripping state includes information about successes/failures in gripping and information about the degree of deformation of each article A. The created table or formula is stored in the storage unit 23 along with the information for learning.

For example, the control unit 21 investigates the correlation between the gripping state and the relationship of the size information with the air pressure in the picking process. Alternatively, the control unit 21 may investigate the correlation between the gripping state and the relationship of the size information with the air pressure in the picking process, as well as the type or quality of the articles A.

The above information, such as the specifications of the robot hand 30 and the gripping portions 31, the conveying speed of the conveyer device 2, and the information about the quality of the articles, may be input by the operator to the robot controller 20. The operator may also observe successes/failures in gripping or the degree of deformation of each article A during the picking process and input the observed results to the robot controller 20 to be used for the above learning. Also, results of inspection at a quality inspection step may be input to the robot controller 20 and used for the above learning.

Thus, the learning performed in the robot controller 20 allows the robot hand 30 to more appropriately grip the articles A.

Figure 11:
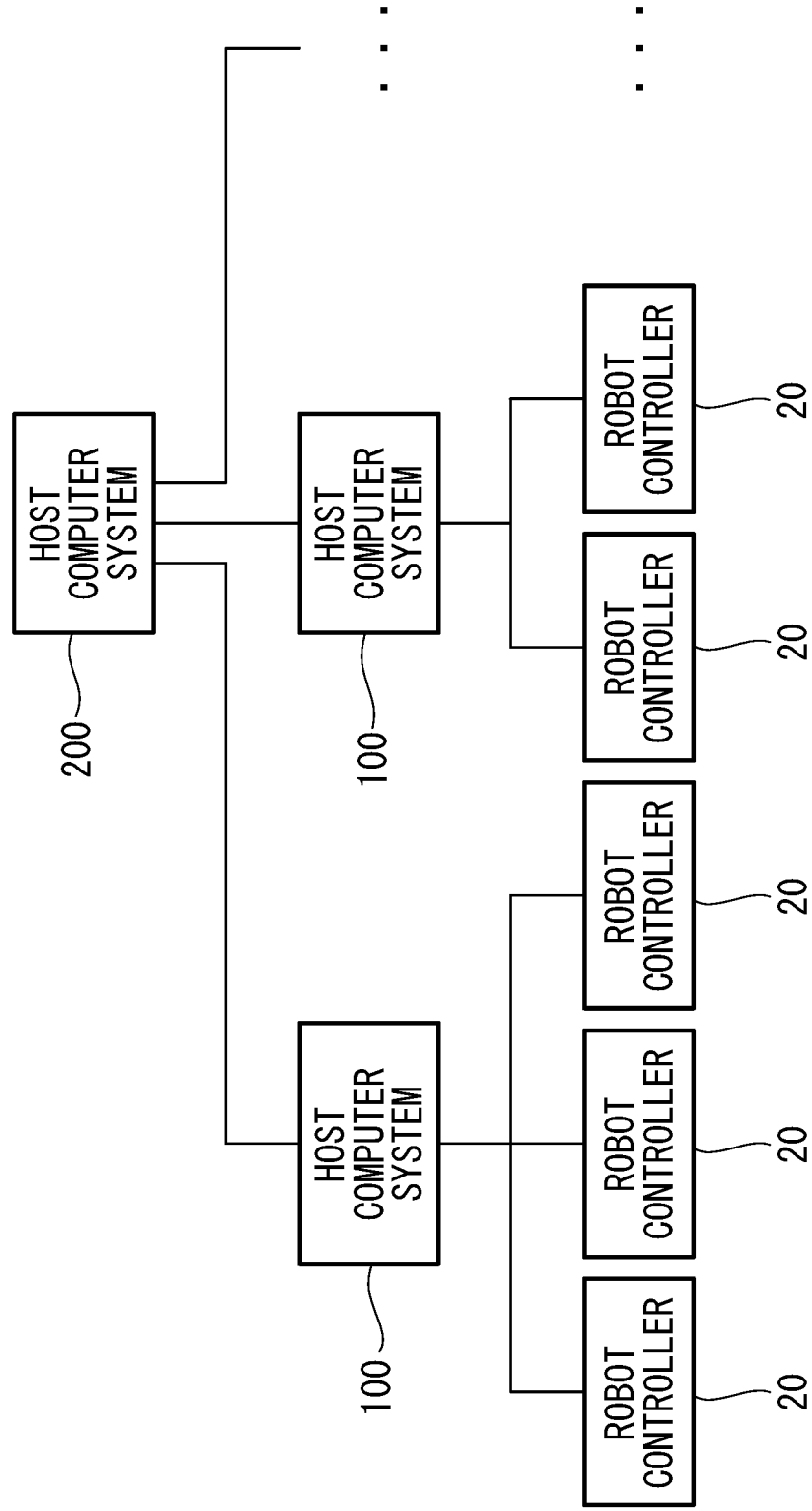
FIG. 11 is a block diagram of a management system including robot controllers in the embodiment.

As shown in FIG. 11, multiple robot controllers 20 may be connected to a host computer system 100. The host computer system 100 may be a computer connected with the robot controllers 20 by wired connection, or may be a computer located in the same premise as the robot controllers 20, for example. The host computer system 100 is sometimes referred to as a fog computer. The host computer system 100 may be a system such as a production management system, a shipment management system, a robot management system, or a departmental management system.

Multiple host computer systems 100 may be connected to another host computer system 200. The host computer system 200 may be a cloud server connected with the host computer systems 100 by wired or wireless connection, for example. The robot controllers 20 and the host computer systems 100 and 200 form a management system, for example. Each of the host computer systems 100 and 200 includes: a control unit including a processor; a display device; a storage unit including nonvolatile storage, ROM, and RAM; and an input device that may be a keyboard, a touch panel, or an operation panel.

Figure 12:
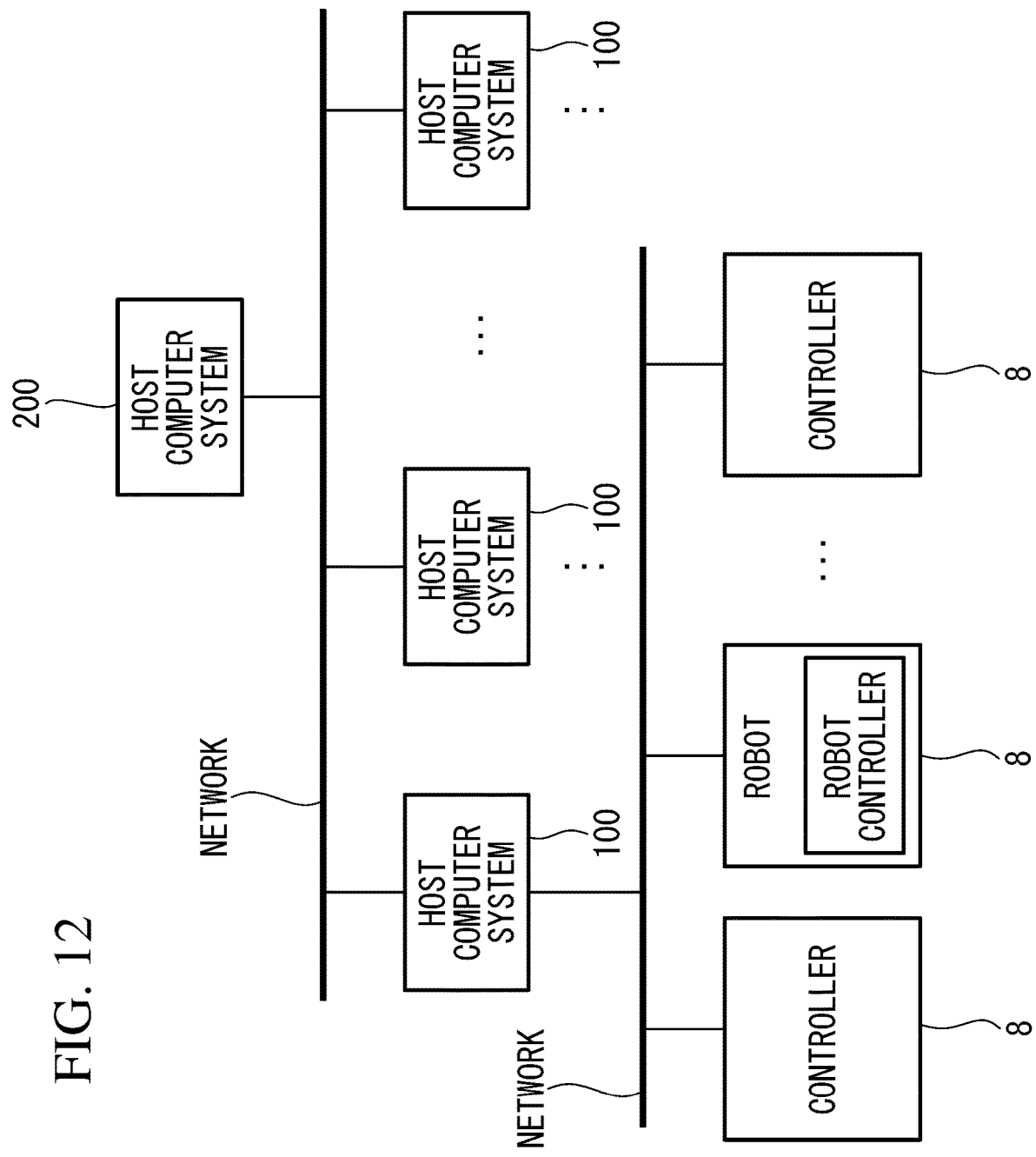
FIG. 12 is a block diagram of a system including robot controllers in the embodiment.

Such a system may include, as shown in FIG. 12 for example, multiple edge computers 8, multiple host computer systems 100, and at least one host computer system 200. In the system in FIG. 12, the edge computers 8 may be controllers, robot controllers, and robots. Part of the controllers, robot controllers, and robots may be included in the host computer systems 100. The system in FIG. 12 includes a wired or wireless network.

Figure 13:
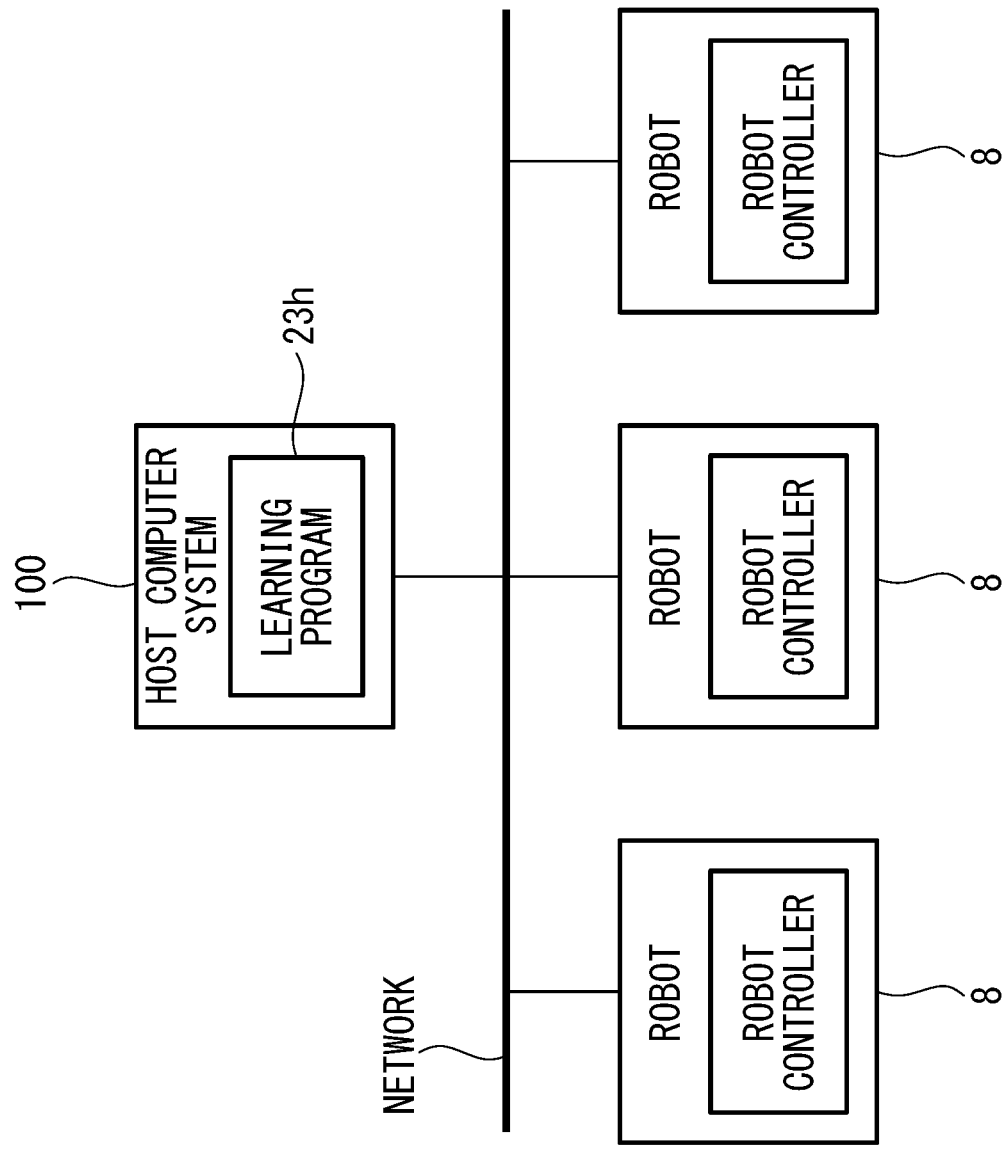
FIG. 13 is a block diagram of a system including robot controllers in the embodiment.

The edge computers 8 may transmit the above-described information for learning to the other edge computers 8, the host computer systems 100, or the host computer system 200 that have the above-described learning function. For example, the transmission takes place in the configuration shown in FIG. 13. In this configuration, the other edge computers 8, the host computer systems 100, or the host computer system 200 that have the learning function can perform learning using the received information for learning to automatically and accurately determine operation parameters (a result of the learning) or operation programs (a result of the learning) to be used by each edge computer 8 for controlling the robot.

The other edge computers 8, the host computer systems 100, or the host computer system 200 that have the learning function can use the received information for learning to determine operation parameters (a result of the learning) or operation programs (a result of the learning) common to the multiple robots controlled by the respective edge computers 8. That is, the robots share the same operation parameters or operation programs. According to this system, the learning speed and reliability can be improved using various data sets.

Figure 14:
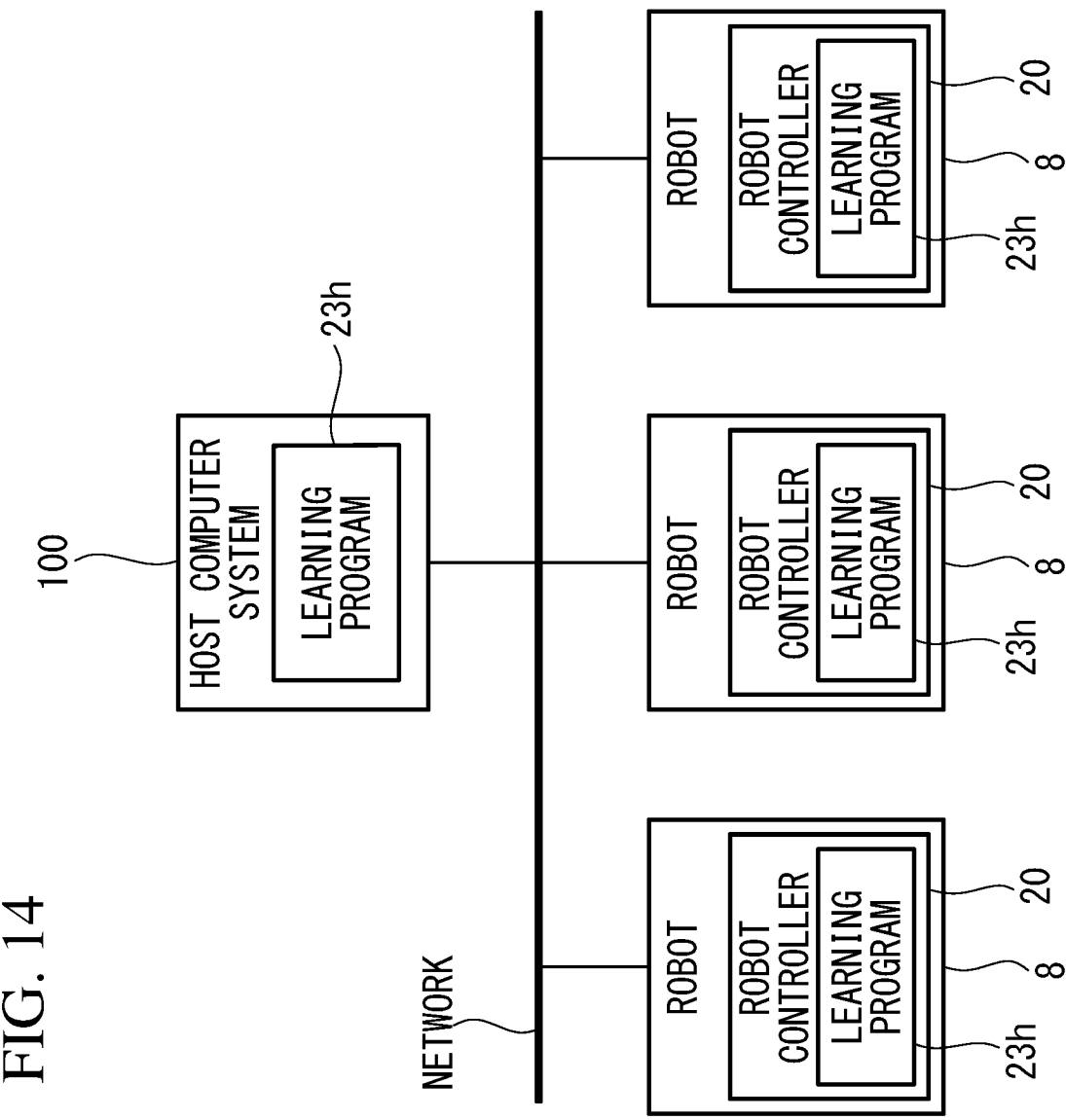
FIG. 14 is a block diagram of a system including robot controllers in the embodiment.

Some of the edge computers 8 and host computer systems 100 that have the above-described learning function may transmit at least one of the above-described information for learning, a learning model created in the learning, and the result of the learning, to other edge computers 8, other host computer systems 100, or the host computer system 200 that have the above-described learning function. For example, the transmission takes place in the configuration shown in FIG. 14. The other edge computers 8, the other host computer systems 100, or the host computer system 200 that have the learning function optimize knowledge or improve efficiency based on the received information, thereby creating a further optimized or efficient learning model or result of the learning. The created learning model or result of the learning is distributed to the edge computers 8 that control the robots. If the result of the learning is distributed, the recipient edge computers are not required to have the learning function.

The information for learning, the learning model, and the result of the learning can be shared among the edge computers 8. For example, the sharing takes place in the configuration shown in FIG. 14. This leads to improved efficiency of machine learning. Some of the network-connected edge computers 8 may implement the learning function, and the result of learning in these edge computers 8 may be used by the other edge computers 8 for controlling their robots. This leads to reduced costs required for machine learning.

Examples according to the above embodiment will be described below.

Figure 10:
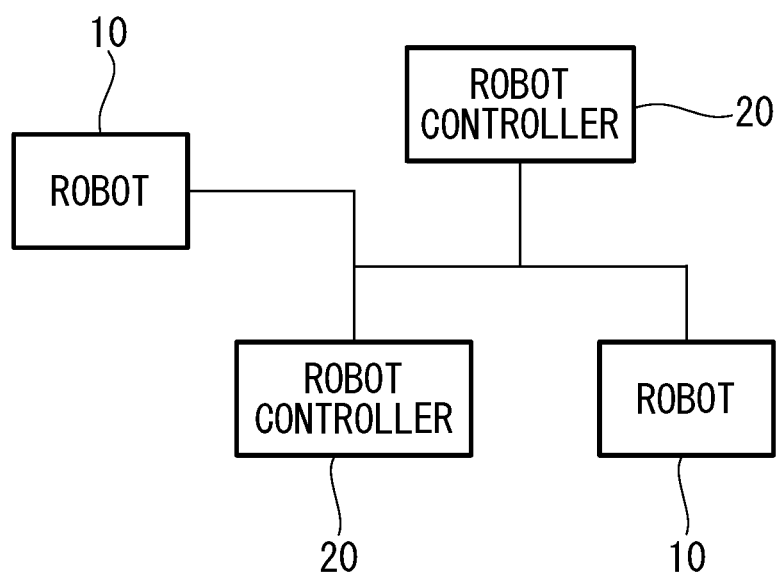
FIG. 10 is a block diagram of a management system including robot controllers in the embodiment.

For example, as in FIG. 10, one robot controllers 20 may be connected to another robot controller 20. Then, a table (a result of learning) or formula (a result of learning) obtained through learning as described above may be transmitted, along with necessary information, by the wired or wireless transmission/reception unit (an output unit) 25 of the one robot controller 20 to the other robot controller 20. The necessary information may include the specifications of the robot 10 and the conveyer device 2, the specifications of the robot hand 30 and the gripping portions 31, the information about the quality of the articles, etc., related to the creation of the table or formula. The other robot controller 20 similarly transmits a result of learning to the one robot controller 20.

The one robot controller 20 and the other robot controller 20 can use the received table or formula for the task of picking the articles A. The one robot controller 20 and the other robot controller 20 can also use the received table or formula as the information for learning.

The table or formula obtained through the learning may be transmitted, along with necessary information, from the robot controllers 20 to the host computer systems 100 or the host computer system 200 (FIG. 11). The necessary information may include the specifications of the robot 10 and the conveyer device 2, the specifications of the robot hand 30 and the gripping portions 31, the information about the quality of the articles A, etc., related to the creation of the table or formula.

The host computer systems 100 or the host computer system 200 can perform learning using multiple tables or formulas related to specifications of the same or similar type of robot hands 30 or gripping portions 31 to create a new table or formula.

The host computer systems 100 or the host computer system 200 transmits the created table or formula to the robot controllers 20.

Some robot controllers 20 can use the received table or formula for the task of picking the articles A. Other robot controllers 20 may use the received table or formula as the information for learning in performing learning.

The robot controllers 20, the host computer systems 100, or the host computer system 200 may transmit the created table or formula to robot controllers having no learning function. The robot controllers having no learning function, and their robot hands, may accordingly improve gripping of the articles.

From the above-described embodiments, the following aspects of the present disclosure are derived.

A first aspect of this disclosure is a robot controller that controls a robot hand which grips an article with a plurality of gripping portions. The robot controller includes: a size information acquisition unit which acquires size information about the article based on an image obtained by a visual sensor for detecting the article; and a gripping adjustment unit which changes, in response to the size information, a gripping distance that is a space between the gripping portions in a gripping state, or a gripping force of the gripping portions in the gripping state.

Thus, since the gripping distance or the gripping force is changed in response to the size information, soft articles that may vary in shape are appropriately gripped by the gripping portions.

In the above aspect, the size information is preferably an area value of a region detected as the article in the image.

Here, if the articles are food such as cream puffs, bread, or cakes, the articles may vary in shape or hardness. Also, especially if the articles are filled with a highly viscous liquid such as cream, pressing a portion of the periphery of an article often tends to cause other portions of the periphery to expand. In this case, even with a portion of the periphery pressed, it can also be said that the change in the area of the article in a planar view is relatively little.

In the above aspect, the gripping distance or the gripping force is changed according to the area value of the region detected as the article in the image. This is advantageous for appropriately gripping the articles that may vary in shape.

In the above aspect, the size information is preferably dimension data about the region detected as the article in the image.

The dimension data may be the maximum or average diameter of the article in the image. Still in this case, the articles that may vary in shape can be appropriately gripped.

In the above aspect, the dimension data is preferably the perimeter of the region detected as the article in the image.

If the dimension data is the maximum or average diameter of the article in the image, the dimension may vary with the direction in which the diameter is measured. Using the perimeter data as the dimension data can reduce the likelihood of occurrence of such variations.

In the above aspect, the robot hand preferably has a hand control device that changes the gripping distance or the gripping force in multiple levels. The robot controller preferably includes a storage unit that stores a table or formula correlating values of the size information with the multiple levels. The gripping adjustment unit preferably uses the table or the formula to transmit, to the hand control device, a control signal for setting the gripping distance or the gripping force to a level, among the multiple levels, in response to the size information.

The robot hand that changes the gripping distance or gripping force of the gripping portions in the multiple levels is easy to control, as well as easy to simplify in structure. Therefore, such robot hands are often used in manufacturers of articles to be picked.

In the above aspect, the table or formula that correlates the gripping distance or the gripping force with values of the size information is used to transmit, to the hand control device, a control signal for setting the gripping distance or the gripping force to a level in response to the size information. This can simplify control in the robot controller and reduce efforts required for adjusting the gripping distance or the gripping force.

In the above aspect, preferably, the gripping adjustment unit changes values of the size information corresponding to each of the levels based on the distribution of the size information about a plurality of the article in the image or in a plurality of images.

Thus, based on the distribution of the size information about the articles in the image(s), the gripping adjustment unit changes the values of the size information corresponding to each level of the gripping distance or gripping force. This is advantageous for reducing failures to pick the articles or reducing breakage of, deformation of, and contact marks on the articles.

A second aspect of this disclosure is a robot controller that controls a robot hand gripping an article with a plurality of gripping portions. The robot controller includes: a size information acquisition unit which acquires size information about the article; a gripping adjustment unit which changes, in response to the size information, a gripping distance that is a space between the gripping portions in a gripping state, or a gripping force of the gripping portions in the gripping state; and a learning unit that performs learning for improving the gripping state based on the size information and information about the gripping state in which the robot hand grips the article.

A third aspect of this disclosure is a management system including: a robot controller that controls a robot hand for gripping an article; and a host computer system capable of communicating with the robot controller. The robot controller includes: a learning unit that performs, based on size information about the article and information about a gripping state in which the robot hand grips the article, learning for improving the gripping state; and an output unit that outputs a result of the learning to the host computer system. The host computer system accumulates the result of the learning received from the robot controller.

In the above aspects, in order to appropriately grip soft articles with a robot hand, the gripping distance or gripping force of the plurality of gripping portions (such as robot fingers) can be changed as appropriate according to the condition of the articles.

REFERENCE SIGNS LIST 2 conveyer device
10 robot
11 main body
14 wrist unit
14a wrist flange
15, 16 servo motor
20 robot controller
21 control unit
22 display device
23 storage unit
23h learning program (learning unit)
24 input device
25 transmission/reception unit
26, 27 servo controller
30 robot hand
31 gripping portion
31a internal space
32 air supply tube
40 hand control device
50 visual sensor
100 host computer system
200 host computer system
A article

The invention claimed is:

1. A robot controller that controls a robot hand which grips an article with a plurality of gripping portions, wherein a processor of the robot controller is configured to conduct:
a size information acquisition process which acquires size information about the article;
a gripping adjustment process which changes, in response to the size information, a gripping distance that is a space between the gripping portions in a gripping state, or a gripping force of the gripping portions in the gripping state;
a receiving process which receives at least one of information about an observed gripping state obtained by imaging, with an imaging device for observation, a state of gripping the article when the robot grips the article, and information about an observed gripping state obtained by an operator who observes a state of gripping the article when the robot grips the article and inputs an observed result to the robot controller;
a learning process that performs learning for improving the gripping state based on the size information and information about the observed gripping state obtained by the receiving process; and
wherein the processor uses results of the learning process to create a table that correlates the size information with gripping force levels for improving the gripping state.

2. The robot controller according to claim 1, wherein the processor is configured to conduct an output process that outputs a result of the learning.

3. The robot controller according to claim 1, wherein the robot controller is configured to output the result of the learning to another robot controller and to receive a result of learning from the other robot controller.

4. The robot controller according to claim 1, wherein the robot controller is configured to output the result of the learning to a host computer system and to receive a result of learning from the host computer system.

5. The robot controller according to claim 1, wherein:
the processor is configured to conduct a quality receiving process that receives results about a quality of the article obtained in a quality inspection step; and
the learning process uses the results about the quality.

6. A system comprising:
a robot controller that controls a robot hand for gripping an article;
a host computer system capable of communicating with the robot controller;
wherein a processor of the robot controller is configured to conduct:
a receiving process which receives at least one of information about an observed gripping state obtained by imaging, with an imaging device for observation, a state of gripping the article when the robot grips the article, and information about an observed gripping state obtained by an operator who observes a state of gripping the article when the robot grips the article and inputs an observed result to the robot controller;

a learning process that performs, based on size information about the article and the information about the observed gripping state, learning for improving the gripping state wherein the processor uses results of the learning process to create a table that correlates the size information with gripping force levels for improving the gripping state; and an output process that outputs a result of the learning to the host computer system; and wherein the host computer system accumulates the result of the learning received from the robot controller.

7. The system according to claim 6, wherein the host computer system is configured to transmit, to the robot controller, a result of learning performed in the host computer system using the received result of the learning.

8. The system according to claim 6 wherein the host computer system is configured to transmit, to a robot controller having no learning function, the received result of the learning or a result of learning performed in the host computer system using the received result of the learning.

9. The system according to claim 6 wherein:
the processor is configured to conduct a quality receiving process that receives results about a quality of the article obtained in a quality inspection step; and
the learning process uses the results about the quality.

10. A robot controller that controls a robot hand which grips articles one by one with a plurality of gripping portions, the robot controller comprising a processor, wherein the processor is configured to conduct:

a size information acquisition process which acquires a plurality of pieces of size information corresponding to the articles, respectively, based on an image obtained by a visual sensor; and a gripping adjustment process which changes, in response to each of the plurality of pieces of size information, a gripping distance that is a space between the gripping portions in a gripping state, or a gripping force of the gripping portions in the gripping state, wherein the robot controller further comprises:
a hand controller which changes the gripping distance or the gripping force to two or more predetermined levels; and a memory storing a table which associates the plurality of pieces of size information with the two or more predetermined levels in a situation where the plurality of pieces of size information is within a first range, an other table which associates the plurality of pieces of size information with the two or more predetermined levels in a situation where the plurality of pieces of size information is within a second range narrower than the first range, wherein the processor is configured to change, in the gripping adjustment process, the gripping distance or the gripping force when the robot hand grips the articles one by one by using the table or the other table, which is selected by a user, and the hand controller.

* * * * *